Patented Feb. 25, 1930

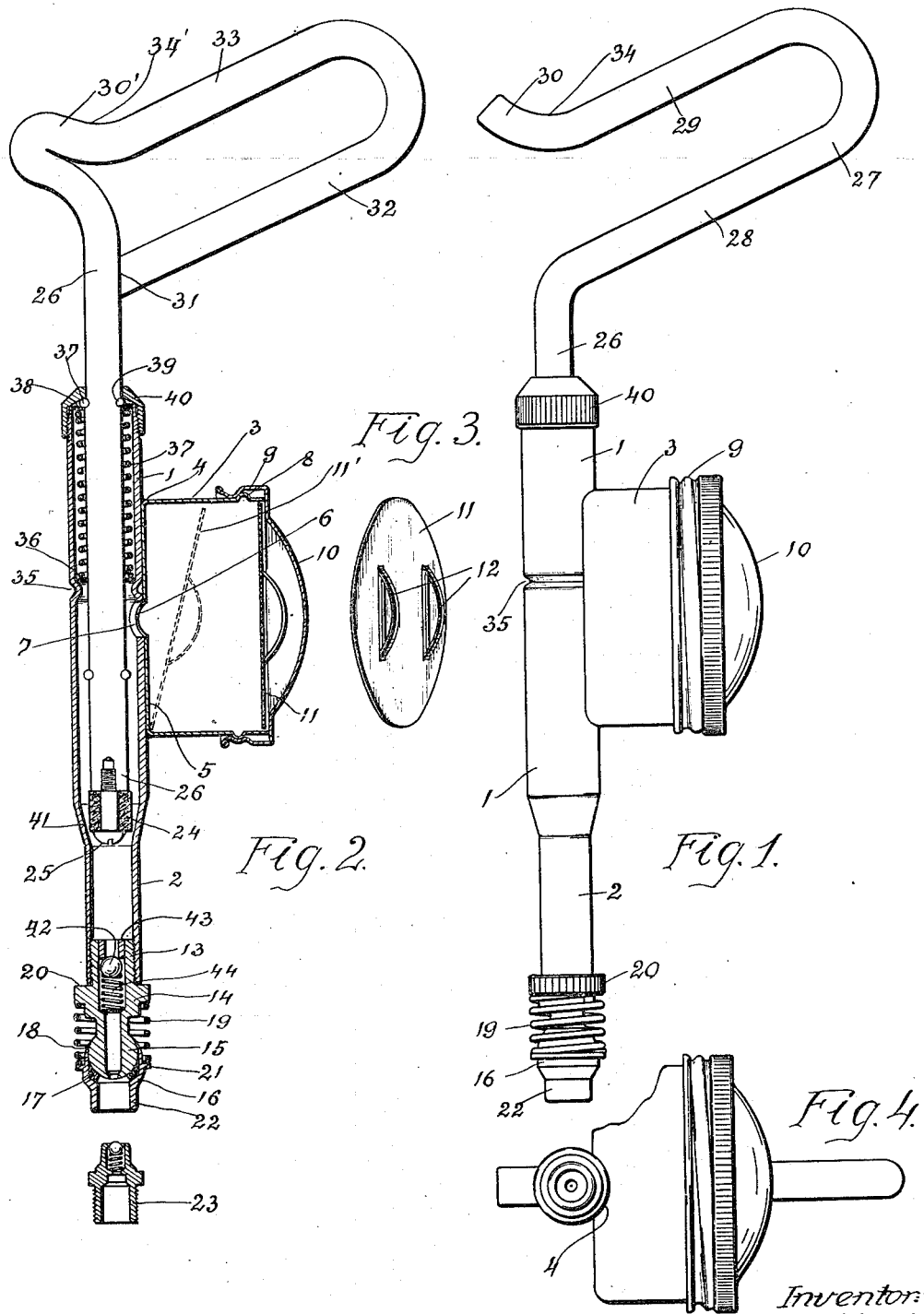

1,748,818

UNITED STATES PATENT OFFICE

OSCAR U. ZERK, OF CHICAGO, ILLINOIS

LUBRICATING GUN

Application filed September 30, 1929. Serial No. 396,354.

My present invention relates to lubricating guns and more especially to that class of lubricating guns commonly known in the trade as grease guns and oil guns, which are employed for the purpose of quickly and easily supplying a quantity of lubricant to bearing nipples of an automobile chassis or other mechanism requiring periodic lubrication.

The apparatus of my present invention is equally well adapted for use in connection with the lubrication of vehicles, such as the chassis bearings of automobiles, tractors, gun carriages, war tanks, locomotives, airplanes, air ships, sea vessels, etc., or in connection with industrial lubrication, which includes the lubrication of stationary machines, such as stamping presses, printing presses, engines, textile machinery, shafting, and all the other numerous types of machines and machine tools of modern industry.

In grease gun lubrication two types of apparatus are commonly used: First, the interlocking type employing a coupling for the purpose of temporarily rigidly interlocking the lubricating gun nozzle and the lubricant receiving nipple, and second, the contact type where the lubricating gun nozzle and nipple are not temporarily rigidly interlocked, but simply pressed against each other and held in lubricant communicating contact by manual pressure during the lubricating period.

My present invention applies to both the interlocking and contact type of guns, although it is believed to have a more particular application to guns of the contact type. The dimension of the lubricant containing reservoir, or barrel, not only depends upon the quantity of lubricant which the barrel is required to hold, but also upon such other considerations as the necessity of operating the gun in connection with lubricant receiving nipples which are often located in positions difficult of access, considerations involved in the guns, and in the packaging and sale of the same.

The average relation between the diameter and length of the barrel in the more common of prior gun constructions is about that of 1 to 2½, wherein the diameter of the gun barrel was about 1¾ of an inch for a medium size lubricant gun and 1⅜ of an inch for the smallest type of lubricant gun.

The use of such guns having barrels of so large a diameter makes the placement of the lubricant gun, in alignment with the lubricant receiving nipple a very difficult operation, so that in the use of guns of the contact type, the operator has been forced to bring the axis of the lubricant gun so far out of alignment with the axis of the lubricant receiving nipple that the nipple engaging end of the nozzle of such lubricant guns often failed to make a proper lubricant tight engagement with the lubricant receiving nipple. This usually results in the lubricant, not finding any resistance at the contacting portion between nozzle and nipple, is wasted through the disengaged part of the contacting portions and little or no lubricant is forced into the bearing served by the nipple.

Although this difficulty could be solved by making the diameter of the lubricant barrel exceedingly small, this would involve a loss of lubricant capacity, and for every reduction in half of the diameter, the barrel would have to be made four times as long in order to maintain the same volumetric content. Such a gun would be very unhandy and very unsightly. In my present invention, therefore, I place the lubricant barrel laterally of, and disposed at right angles to, the lubricant pressure piston, instead of in axial alignment therewith. I then provide a slender tube providing a cylinder for a lubricant pressure piston, and a guiding tube therefor, whose outside diameter is preferably not greater than ⅝ of an inch.

I also preferably provide the gun with a nipple engaging nozzle of such form that the lubricant barrel can be oscillated from alignment with the axis of the nipple to place it in such a position where it will not interfere with any adjacent part of the mechanism carrying the nipple; I, therefore, contemplate the use of the gun of my present invention in connection with a nozzle and nipple construction as is more particularly disclosed and claimed in my copending companion application for United States Letters Patent, Serial No. 396,352, filed September 30, 1929, (Case 11).

However, particularly in its broader aspects my gun may be employed with other nozzle and nipple constructions, as will be apparent to those skilled in this art to which my invention appertains.

The lubricant containing barrel is made of large diameter relative to its length, being preferably of a diameter twice its length, thereby achieving important advantages. Such a barrel being relatively short and shallow is capable of being easliy filled with grease with little entrapment of air bubbles, and has the additional advantage of being capable of ready disposition out of the way of the structural elements of the car, when applied to a nipple to supply lubricant thereto.

The barrel being in the form of a shallow cup is relatively inexpensive to manufacture, since a barrel of the shallow type shown, can be made in one drawing operation without annealing, while a deep elongated tubular barrel of the relatively small diameter employed in the older type of guns, requires 6 to 10 drawing operations, with 1 to 3 interposed annealing operations.

Also, should a relatively long barrel be employed, filled with grease, with no follower, and wherein the grease is pumped from an end outlet, it is found that a conical depression will be formed at the surface of the grease disposed at the opposite end of the barrel, and which gradually is deepened to take the form of a funnel which finally effects a substantially conical bore through the body of grease to communicate with the suction port of the pumping piston chamber, and thereafter air only is supplied to the piston pressure chamber, although only a small part of the grease in the grease barrel has been drawn into the pressure chamber while the large amount of grease remaining in the barrel cannot be drawn into the pressure chamber to be formed from the gun nozzle.

To overcome the above described action, piston followers have been placed within the rear end of the barrel in contact with the rear surface of the grease, with a longitudinal guide which was required to prevent the tilting of the follower disc due to irregularly distributed air bubbles, contained in the grease, such air bubbles creating an unbalance of the adhesive and cohesive effects of the grease upon the lateral walls of the barrel, and an unguided piston follower would be deflected and in the continued use of the gun is successive operation, would be increasingly inclined until the follower has rotated to such a position that the suction effect exerted upon the body of grease will produce the more or less funnel-shaped bore through the grease, laterally of the now greatly tilted follower which was above previously described as occurring in guns wherein no follower was used, and the same disadvantage previously related occurs.

Such a condition results when the disc has become inclined to such an angle that one side of the disc touches the bottom or end wall of the grease gun barrel. When this happens, the suction outlet between barrel and pump pressure chamber will soon be exposed to the irregular movement of the grease, an air funnel is created and a large amount of grease is left in the container without being drawn into the pressure chamber. When the effective length of the barrel is larger than its diameter, the above defect in operation is commonly had.

I, therefore, provide a grease containing barrel whose length is preferably so much less than its diameter, whereby the freely moving follower cannot turn in excess of an angle of about 20 degrees before engagement of one side of the follower disc, with the bottom of the barrel. In such a case, the center of the freely moving disc follower remains approximately in the middle of the lubricant barrel, and under further suction effort exerted upon it, resulting from movement of the piston, the now inclined surface of the grease covered by the freely moving disc follower slowly levels itself out, until the disc follower is flush with the bottom of the barrel, at the end of its movement, wherein substantially all grease will have left the barrel.

An object of my invention, therefore, is to provide a lubricant gun, having a lubricant storage chamber as a unitary part of the gun in which a sufficient quantity of lubricant may be stored, but which will be so formed as to permit the ready application of the gun nozzle to a lubricant receiving nipple even though the nipple is placed in a relatively inaccessible position on a mechanism a bearing of which is to be supplied with lubricant from the gun through the nipple.

Another object of my invention is to provide a lubricant gun of improved construction readily applicable to any of a plurality of lubricant nipples, though these are disposed in relatively inaccessible positions.

Another object of my invention is to provide an improved lubricating gun which may be readily manufactured in quantities in a highly efficient form, at low cost.

Another object of my invention is to provide an improved lubricating gun having a relatively high lubricant storage capacity but wherein the advantages of longitudinal slenderness in promoting access of the dispensing nozzle of the gun to lubricant receiving nipples, placed in relatively inaccessible positions, are obtained.

Another object of my invention is to provide an improved lubricating gun having a lubricant storage reservoir, wherein the element of providing the reservoir may be readily and inexpensively made, separately from the other parts of the gun and wherein such element may be readily and inexpensively applied to such other parts to form an efficiently operative unitary gun structure.

Another object of my invention is to provide an improved lubricant storage reservoir element for a lubricating gun wherein no special provision for guiding a simple form of lubricant follower is required in order to efficiently effect the above related function for which such followers are used.

Another object of my invention is to provide an improved lubricating gun wherein the charging of the lubricant reservoir thereof may be simply and expeditiously accomplished.

Another object of my invention is to provide an improved lubricating gun having a relatively inexpensive but highly efficient combination element providing the gun with a handle of improved form and piston rod.

Another object of my invention is to provide an improved element for a lubricating gun effecting in an improved manner the dual functions of a gun handle and a piston rod.

Another object of my invention is to provide an improved lubricating gun having a novel highly efficient form of lubricant reservoir and cooperant lubricant follower.

Another object of my invention is to provide an improved element for a lubricating gun effecting in an improved manner the dual functions of a gun handle and a piston rod, and wherein the handle portion is in the form of a pistol grip.

Another object of my invention is to provide an improved lubricating gun employing a nozzle of the contact type, wherein a piston rod is provided, bent at an end projecting from the rear end of the gun to form a hand grip.

Another object of my invention is to provide an improved lubricating gun with a grease follower incorporated in the lubricant reservoir thereof and so related to the form of the reservoir as to operate in such an efficient manner that substantially all of the lubricant will be susceptible of withdrawal from the reservoir and to be injected from the gun to lubricant receiving nipples in successive operations of the gun.

Another object of my invention is to provide an improved lubricating gun and with which there is incorporated a lubricant reservoir so formed as to permit the use of a grease follower of such a form that the follower may automatically operate during successive operations of the gun and responsive thereto to effect withdrawal of substantially all of the lubricant contained in the reservoir, before failure of the gun to discharge lubricant to nipples engaged by the gun nozzle.

Another object of my invention is to provide an improved grease gun employing a follower for the grease containing reservoir thereof, the follower and reservoir being so interrelated as to eliminate the necessity of providing a separate guide for the follower to insure proper movement thereof.

Another object of my invention is to provide an improved hand grip for lubricating guns.

Another object of my invention is to provide an improved lubricating gun employing a nozzle of the contact type, wherein a piston rod is provided, bent at an end projecting from the rear end of the gun to form a hand grip in such manner that it will take the manual thrust at substantially a right angle to the fleshy portion between the thumb and the fore finger of the operator's hand, thus preventing slipping of the hand, on the grip, while operating the gun.

Another object of my invention is to provide an improved lubricating gun, formed in an improved manner to expedite sighting over the barrel thereof to direct the gun nozzle towards the nipple.

Another object of my invention is to provide an improved lubricating gun of the contact type.

Other objects of my invention and the invention itself will be better understood by reference to the following description of a certain embodiment of my invention, illustrated in the accompanying drawings, referred to in said description.

In the drawings:

Figure 1 illustrates in side elevational view a lubricating gun which is an embodiment of my invention;

Figure 2 is a view in longitudinal medial section of the gun of Figure 1 employing, however, a different form of handle;

Figure 3 is an isometric view of a lubricant follower employed in the gun of the foregoing figures; and Figure 4 is an end elevational view of the gun of Figures 1 and 2.

Referring now to the different figures of the drawings, in all of which like parts are designated by like reference characters, at 1 I show an elongated slender tube having a reduced end 2 forming a piston cylinder. At 3, is shown a lubricant reservoir in the form of a shallow cup, having an end wall 5 which is rigidly affixed to a lateral wall of the relatively enlarged portion of the tube 1 by soldering the exterior surface of the tube 1 within a transversely grooved portion 4 of the end wall 5, the contiguous surfaces of the tube and cup end wall being closely sealed together so that lubricant passing through aligned openings 6 and 7 of the cup end wall and the lateral wall of the tube to communicate lubricant from the reservoir to the interior of the tube cannot flow between the contiguous interengaging surfaces.

I have elsewhere herein emphasized the importance of providing my improved gun with a shallow cup, such as that shown at 3, and it will be understood that in this specification and in the appended claims, where I refer to a shallow cup of this character, that I refer to one whereof the depth is not more than its diameter, and preferably wherein the depth is not more than two-thirds of the diameter of the cup. In the embodiment illustrated, actually, the depth is merely one-half of the diameter.

The cup is provided with an outwardly extending helical bead 8 near its rim over which a cooperatively threaded annular flange 9 of a cover cap 10 may be threaded to provide the reservoir cup 3 with a substantially leakproof covering.

A grease follower shown in isometric view in Figure 3 is placed within the cup, as shown as 11 in Figure 2, the follower being in the form of a disc with preferably a pair of manually engageable hand grip flanges 12, extending rearwardly therefrom to facilitate removal and re-insertion of the follower, as when replenishing the reservoir with a new supply of grease.

The piston cylinder portion 2 of the tube 1 terminates in an internally threaded end adapted to receive the externally threaded stem 13 of a flanged nose 14 which, in turn, terminates in a knob 15 upon which the gun nozzle 16 is mounted by a universal joint form of connection.

Although the nose, nozzle and cooperating nipple constructions illustrated in connection with my improved lubricant gun of the present application, is more specifically described, illustrated and claimed, in my aforesaid companion copending application, generally, the nozzle is projected into a rear tubular end of the nozzle 16 against a sealing gasket 17 and the lateral walls of the nozzle adjacent their rear edge being pressed inwardly at 18 to maintain the knob end within the nozzle. A compression spring 19 is interposed between the annular flange 20 of the nose and the annular flange 21 of the nozzle to effect a normal effort upon the nozzle to press it toward its normal position of alignment with the tube 1 of the gun.

The extreme tubular end 22 of the nozzle provides an open mouth adapted to be telescoped over a nipple. such as that shown at 23, to make leakproof engagement with a contact surface of the nipple, as more fully described in my said copending application. A piston 24 of cork, or other suitable material, preferably in the form of an annulus, is secured by a screw 25 onto the end of a piston rod 26, made of heavy wire which projects into the tube 1 from its rear end and which is bent into the form of a handle grip at its end disposed exteriorly of the tube.

The hand grip of my invention may be made in a number of variant forms, two of which are shown in Figures 1 and 2, both comprising a wire loop, that in Figure 1 being an open loop 27 having substantially parallel arms 28 and 29, the free arm 29 terminating in an outturned end 30. The loop of the embodiment illustrated in Figure 3 is reversely turned, the free end 31 of the arm 32 making abutting engagement with the straight portion 26 which projects into the tube 1 to form the piston rod, as before related. The other arm 33 of the closed loop of Figure 2 forming a hand grip, is joined to the straight piston rod 26 by an intermediate abruptly bent V-portion 30' which provides a curved hand engaging surface 34' of the same form as that shown at 34 for the embodiment of Figure 1. The tube 1 is provided with an annular bead 35 projecting inwardly to form a shoulder within the bore of the tube upon which a washer 36 is seated to support one end of a helical spring 37 whose other end engages a like washer 38 making abutting engagement with laterally extending ears 39 formed integrally with the rod 26 by a pinch broaching process, the interposed spring exerting pressure upon the rod 26 and the tube 1 to tend to withdraw the piston 24 from telescoped relation with the reduced cylinder portion 2 of the tube, to position it for a subsequent lubricant ejecting operation, as later more fully described.

The spring 37 is removed from the path of flow of lubricant between the aperture 7 of the tube and the cylinder 2, being placed rearwardly toward the handle of the gun, so that lubricant will not encounter the spring which otherwise would interpose a high resistance to its flow.

The ears 39 form stops engageable with the perforated cap 40 which is screw threaded onto the enlarged end of the tube 1, to prevent the piston rod 26 being withdrawn from the tube 1 more than a predetermined amount corresponding to and predetermining the length of the stroke of the piston 24. The rod 26 engaging the inner edges of the cap perforation is centered thereby, and the converging walls 41 of the tube 1 serve to guide the piston 24 to axial position relative to the piston cylinder portion 2, which it enters upon each forward stroke of the piston rod 26 caused by manually directed pressure effected upon the hand grip provided by the wire loop at the end of the rod 26. A valve ball 42 engaging a valve seat element 43 carried by the stem 13 of the gun nose is normally retained on its seat by a helical spring 44 interposed between the ball and a shoulder of the tubular bore of the nose, which in turn communicates with the interior of the mouth of the nozzle 16.

The gun of my invention having its tube 1 and its lubricant reservoir 3 filled with grease and with the parts shown and described in their illustrated relative positions, operates as follows:

The operator points the slender tube 1 toward the nipple, such as that indicated at 23, assumed to be affixed in lubricant communicating relation to a bearing to be lubricated, and by a forwardly directed movement of his hand clasping the handle which, for example, is assumed to be that illustrated in Figure 3, by its wire arms 32 and 33, and with the fleshy part of his hand intermediate his thumb and index finger thrust against the rounded surface 34' of the hand grip, the nozzle mouth 22 is telescoped over the end of the nipple to make leakproof lubricant communicating engagement therewith.

The manner and method of achieving leakproof lubricant communicating contact with such a nipple will not be described in detail herein, since the same is fully described in my aforesaid copending application to which reference may be had for a full and complete disclosure of the operation of this part of my lubricating system.

After contact is made lubricant is ejected in quantity substantially equal to that contained in the cylindrical portion 2 of the tube 1, by the act of the operator continuing the forward pressure on the hand grip, thrusting the piston rod 26 with the piston 24 supported on the end thereof, further into the tube 1.

The forwardly moving piston 24 soon engages the lateral walls of the said cylinder portion 2 shutting off communication of lubricant between the enlarged and reduced portions of the tube disposed, respectively, to the rear and forwardly of the piston. The lubricant in the cylinder 2 is then displaced by the forwardly moving piston past the valve ball 42 which is unseated by the increased pressure of lubricant on its approach side, and forced through the intercommunicating bores of the nose 15, nozzle 16 and nipple 23, and into the passages of the mechanism bearing served with lubricant by the nipple.

The operator then withdraws the gun from the nipple and the tube 1 is thrust forwardly by the spring 37 to separate the piston 24 and cylinder 2 which are restored to their relative positions, shown in Figure 2.

By the construction provided the applicant is enabled to sight along that side of the tube 1 opposite to the positions of the handle and lubricant reservoir, in order to carefully place the nozzle into engagement with the nipple, past nearby intervening objects. This sighting may then be accomplished in a similar manner as that involved in sighting a revolver.

The withdrawal of the piston and cylinder from their relatively telescoped lubricant ejecting positions accomplishes a recharging of the bore of the cylinder 2 with lubricant, since preceding any substantial recession of the piston 24 from the cylinder, the valve ball 42 becomes reseated and further spring impelled relative movement of the piston and cylinder reduces the fluid pressure effective within the cylinder to a sub-atmospheric pressure; pressure of atmosphere, therefore, exerted on the outer surface of the lubricant in the reservoir, partially through the follower 11, seated on the surface of the lubricant, effects communication of lubricant therefrom through the aligned openings 6 and 7 and the tube 1 towards the cylinder 2, pressing lubricant past the piston 24 into the bore of the cylinder.

The operator may now successively perform the same operation upon a multiplicity of other nipples disposed variously on the mechanism, for lubricating other bearings thereof and which in an automobile would include the shackle bolt bearings, steering knuckle bearings, and the like, to periodically recharge the cylinder 2 with lubricant after successive discharges of lubricant therefrom until the lubricant in the reservoir 3 is substantially exhausted and the supply of lubricant in the tube 1 is also considerably depleted.

The follower during such periodic operations will ride upon the outer surface of the grease until its movement is stopped because of engagement with the end wall of the reservoir.

The slenderness of the tube 1 is regulated by the factor of fluid pressure multiplication desired to obtain. For instance, with a piston 24 and cylinder 2 having such a diameter, that its area is .0834 square inches, a factor of about 1:12 obtains, wherein a manual effort of one hundred pounds on the hand grip results in a fluid pressure twelve times as great, or of 1200 pounds per square inch in the cylinder 2.

In Figure 2, by dotted lines, I show at 11' a position which is possible to be achieved by the follower 11 under unbalanced conditions arising from non-uniform distribution of the lubricant in the reservoir ocasioned, possibly, by a non-uniform distribution of air bubbles interspersed through the lubricant.

In a shallow reservoir, such as 3, employing a follower of the form shown at 11 only a fifteen degree inclination of the follower is possible relative to a plane which is normal to the axis of the reservoir and, therefore, should the follower be inclined as shown in contact with the body of grease ahead of it drawn from the receptacle to the aperture 6, as before described, the most forwardly disposed edge of the follower engaging with the end wall 5 of the receptacle arrests the forward movement of such edge and the follower will then right itself to take an ultimate position in a plane normal to the axis of the 1 receptacle, meanwhile expressing substantially all of the lubricant from the receptacle.

Having thus described my invention in the embodiments illustrated, I am aware that numerous and extensive departures may be made from the said embodiments, but without departing from the spirit of my invention.

I claim:

1. In a lubricant gun, a tube, a lubricant supplying sheet metal cup laterally secured intimately to said tube by its flat bottom surface adapted to supply lubricant from said cup to said tube, and means to eject lubricant from an end of said tube.

2. In a lubricant gun, ı tube, a lubricant supplying sheet metal cup laterally secured to said tube by a straight portion of its bottom surface at a substantially right angle to the axis of said cup, said cup adapted to supply lubricant to said tube, and compressor means having a pistol grip adapted to eject lubricant from an end of said tube.

3. In a lubricant gun, a tube, a lubricant containing sheet metal cup laterally connected directly to said tube by its bottom surface, lubricant conduit means to conduct lubricant from said cup to said tube, grip means to eject lubricant from said tube and a dispensing nozzle secured to an end of said tube.

4. In a lubricant gun, a tube, a lubricant containing sheet metal cup intimately connected to said tube over at least one straight portion of the bottom surface of the cup, the interior of said cup in lubricant communication with the tube, manually operable means to eject lubricant from said tube, and a dispensing nozzle secured to an end of said tube.

5. In a lubricant gun, a tube of substantially uniform wall thickness, a lubricant containing sheet metal cup intimately connected to said tube by a portion of its bottom surface extending parallel to the axis of said tube, means to eject lubricant from said tube and a dispensing nozzle secured to an end of said tube.

6. In a lubricant gun, a tube of substantially uniform wall thickness, a lubricant containing sheet metal cup intimately connected to said tube, laterally thereof, by a portion of its bottom surface extending parallel to the axis of said tube, pistol grip means projecting from an end of the tube, and revoluble relative thereto manually operable to eject lubricant from said tube, and a dispensing nozzle secured to the other end of said tube.

7. In combination with an elongated sheet metal tubular compressor, a sheet metal cup reservoir for communicating lubricant through a lateral wall of the tube thereto, said lateral wall and an end wall of the cup being directly secured together.

8. In combination with a slender lubricant dispensing tube, lubricant dispensing mechanism longitudinally reciprocable therein, a cup having a flattened end wall for supplying lubricant through said wall thereto, said wall directly intimately engaging the lateral surface of said tube in approximately the longitudinal middle thereof, and means rigidly holding said cup by said wall to said tube, and a rotatable handle for said tube projected from a posterior end thereof.

9. In a lubricant gun, an elongated slender tube, comprising successively disposed integral spring chamber lubricant receiving and lubricant ejecting portions, a piston reciprocable in the tube from the lubricant receiving into the lubricant ejecting portion, a rotatable piston rod therefor reciprocable through said lubricant receiving and spring chamber portions supporting said piston, a shallow metal cup having an end wall with a diametrical groove on its outer surface intimately secured by the outer surface of said groove to an outer surface of the tube, a spring in the spring chamber for retracting the piston from said lubricant ejecting tube portion, the said cup end wall and the engaged wall of the tube being apertured to communicate lubricant from the cup into the lubricant receiving portion of the tube.

10. In a lubricant gun, an elongated dispensing tube, a lubricant reservoir cup secured directly by a wall thereof to a lateral wall of the tube at a point substantially remote from its dispensing end, and an operating thrust handle projecting posteriorally from the tube and rotatably secured thereto.

11. In a lubricant gun, an elongated dispensing tube, a sheet metal lubricant reservoir cup having a depth considerably less than its diameter, secured integrally and intimately by an end wall to a lateral wall of the elongated tube, substantially remote from its dispensing end, in combination with a handle rotatably secured to the tube.

12. In a lubricant gun, an elongated dispensing tube, a sheet metal lubricant reservoir cup having a depth considerably less than its diameter, secured integrally by an end wall directly to a lateral wall of the elongated tube, substantially remote from its dispensing end, in combination with a handle rotatably secured to the tube, said cup end wall provided with a transverse groove transversely arcuately curved to fit the secured outer surface of the tube.

13. The combination of a lubricant compressor of the type employing a compressor piston rod projecting posteriorly from an elongated compressor tube and having a thrust hand grip on the posterior end of the rod, of a lubricant reservoir for said compressor in the form of a shallow cup rigidly affixed to an approximately mid portion of a tube lateral wall, intimately and directly by engagement therewith of a generally flattened end wall of the cup, said thrust hand grip being freely rotatable relative to said tube and cup.

14. In a lubricant gun, an elongated casing therefor, piston and cylinder means therein for ejecting lubricant from an end of the gun, a spring in the casing surrounding the piston for relatively retracting said piston and cylinder, a lubricant reservoir in the form of a shallow cup laterally affixed to an intermediate portion of the casing, and a passage in said casing leading from the reservoir to said cylinder, said spring disposed substantially out of the path of lubricant from said reservoir to said cylinder.

15. In a lubricant gun, an elongated dispensing tube, a sheet metal lubricant reservoir cup having a depth considerably less than its diameter, secured integrally directly to a lateral wall of the elongated tube, substantially remote from its dispensing end, in combination with a handle rotatably secured to the tube, the axis of said cup intersecting said tube, lateral portions of said cup embracing lateral surfaces of the tube.

In witness whereof, I hereunto subscribe my name this 28 day of September, 1929.

OSCAR U. ZERK.